United States Patent Office 3,164,369
Patented Jan. 5, 1965

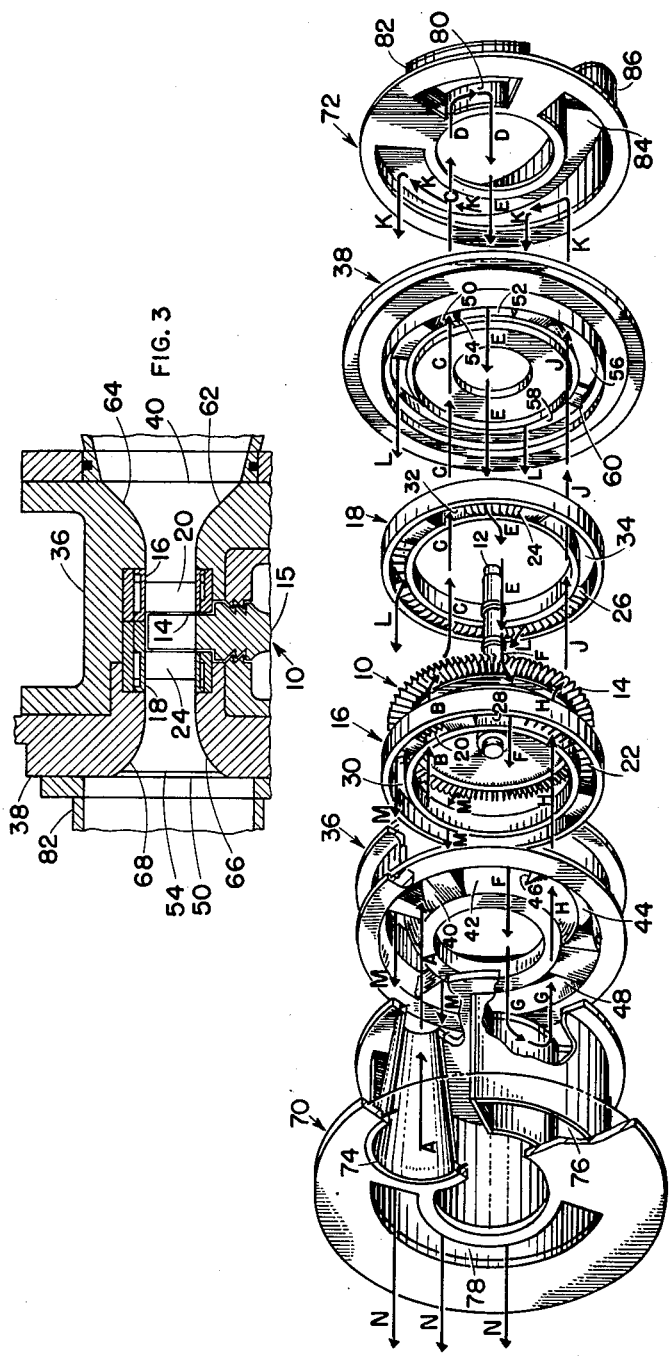

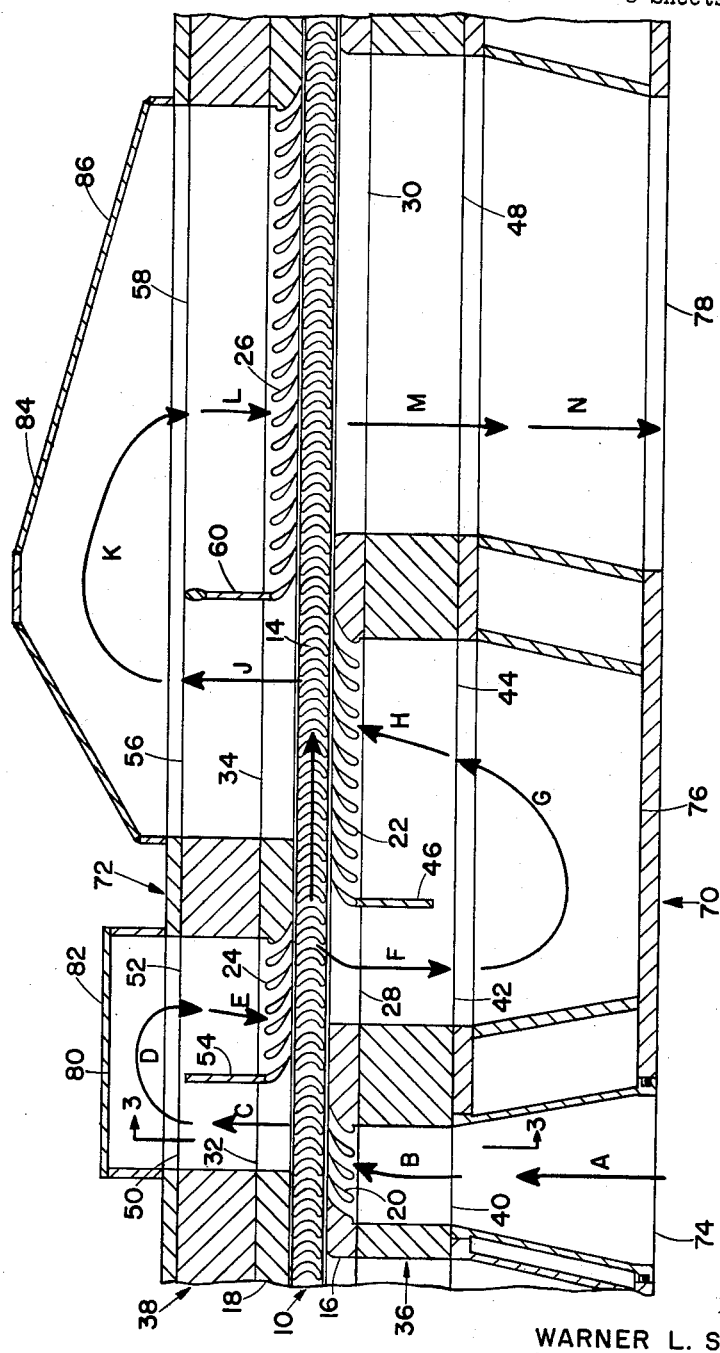

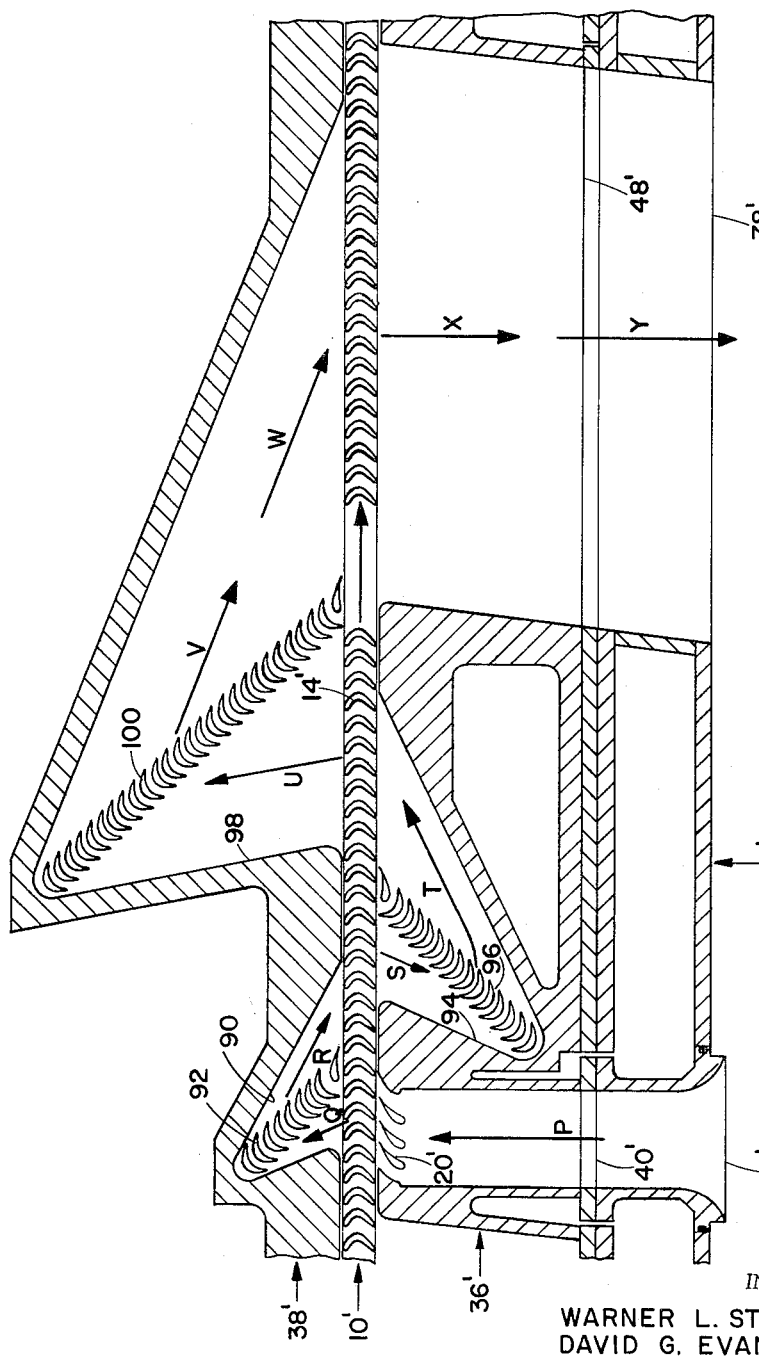

3,164,369
MULTISTAGE MULTIPLE-REENTRY TURBINE
Warner L. Stewart, Parma, and David G. Evans, Avon Lake, Ohio, assignors to the United States of America as represented by the Administrator of the National Aeronautics and Space Administration
Filed Oct. 24, 1962, Ser. No. 232,914
4 Claims. (Cl. 253—66)
(Granted under Title 35, U.S. Code (1952), sec. 266)

The invention described herein may be manufactured and used by or for the Government of the United States of America for governmental purposes without the payment of any royalties thereon or therefor.

This invention is concerned with an axial flow turbine, and more particularly with an improved multistage reaction turbine incorporating a reverse-flow reentry principle.

Turbines of the prior are are not only quite large and heavy but also quite complex, and these turbines have not been satisfactory in installations requiring small overall size, light weight and mechanical simplicity. In such installations the turbine must be able to convert a maximum of its propellant energy to useful work, thus requiring a high turbine inlet propellant enthalpy together with a high turbine pressure ratio and efficiency.

In order to properly utilize these high pressure ratios, the turbine of the present invention is of the multistage reaction type and utilizes the reentry principle because of its suitability to many installations. Multistaging is accomplished by passing the fluid flow through a single rotor several times thereby eliminating the problems inherent with the multiple rotors of conventional turbines. Reentry ducts direct the fluid flow between successive stages located in segments around the rotor annulus. The latter stages act to cool the rotor, allowing for higher turbine inlet temperatures, and hence higher inlet enthalpies than would be possible with conventional turbines.

Our copending application, Serial No. 25,175, filed on April 27, 1960, which issued as U.S. Patent No. 3,070,349, disclosed a crossover reentry turbine wherein the fluid was directed around the rotor between stages to provide unidirectional flow through each stage. Although this type turbine gave satisfactory results, the length of the crossover reentry ducting required to bridge over the rotor between each stage was found to be undesirable because it contributed to losses in efficiency and increased the overall weight size and complexity of the turbine. To overcome these objections, the present turbine utilizes a reverse-flow reentry wherein the fluid reenters on the same side of the rotor from which it was discharged. Thus, the reentry ducts are located on alternate sides of the rotor.

It is, therefore, an object of the present invention to provide a turbine which is structurally uncomplicated, small in size, and light in weight.

Another object of the invention is to provide a turbine which delivers high specific work outputs per unit weight of fluid flow and which has means for effecting an aerodynamic reentry of this fluid flow with a minimum loss of the available energy therefrom.

A still further object of the invention is to provide a multistage multiple reentry turbine which utilizes reverse-flow ducting wherein stator sections are provided in their proper relationship to the rotor blades to obtain the maximum efficiency of the turbine.

Other objects and advantages of the invention will be apparent from the specification which follows and from the drawings in which like numbers are used throughout to identify like parts.

In the drawings:

FIG. 1 is an exploded perspective view, with parts broken away, showing the structural features of a turbine constructed in accordance with the present invention;

FIG. 2 is a schematic view of a preferred embodiment of a multistage multiple reentry axial flow turbine constructed in accordance with the invention;

FIG. 3 is a vertical sectional view taken along the line 3—3 in FIG. 2; and

FIG. 4 is a schematic view of an alternate embodiment of a multistage multiple reentry axial flow turbine constructed in accordance with the invention.

In order to achieve the aforementioned objects, there is provided a multistage axial flow reaction turbine having a single rotor with blades thereon and means for supplying a fluid propellant to these blades. The invention is characterized by a plurality of reentry ducts adjacent the blades for conveying the fluid between the successive stages and means within the reentry ducts for effecting aerodynamic reentry of the fluid with a minimum loss of the available energy of the fluid propellant.

Referring now to the drawings, there is shown a turbine constructed in accordance with the present invention wherein fluid propellant is staged four times through a single rotor 10. The selection of four stages is arbitrary; however, an even number of stages is used because the turbine inlet and exhaust are on the same side thereby simplifying the installation of the turbine in certain applications.

The rotor 10 is preferably machined from a high dampening, stainless steel forging and is mounted for rotation about its normal axis on a shaft 12 shown in FIG. 1. The rotor 10 has a plurality of blades 14 which are positioned around the peripheral edge of a hub 15.

Each of the blades 14 has a short axial chord as seen in FIG. 2 to minimize flow leakage losses due to pumping, a relatively wide channel to allow for easy machineability, and ample solidity to minimize suction surface flow deceleration. Each rotor blade section is further characterized as being nontwisted and symmetrical. Inasmuch as the blade leading edge changes sides at each stage in a manner which will be described subsequently in greater detail, both ends of the blades are designed as leading edges. The suction and pressure surface profiles of each blade are constant from hub to tip, and the blade thickness is held constant from the tip to the mean radius section with a slight linear increase in the blade thickness from the mean radius to the hub radius section. The tapered portion of the blade provides sufficient rigidity to withstand not only the alternate aerodynamic loading and unloading with each staging, but also the various vibration exciting frequencies caused by partial unloadings from stator wakes. A typical turbine rotor constructed in accordance with the invention had a mean blade diameter of 8 inches for a rotor having 120 blades with a spacing of 3° and a chord of 0.4 inch.

The turbine further includes a pair of stator rings 16 and 18 located on opposed sides of the rotor 10. The ring 16 mounts stator blades 20 and 22 at the inlets of the first and third stages respectively while the ring 18 mounts stator blades 24 and 26 at the inlets of the second and fourth stages respectively. Because of the expansion of the fluid propellent as it passes through the turbine, the ring 16 mounts more blades 22 for the third stage than blades 20 for the first stage. Likewise, the ring 18 mounts more blades 26 than blades 24. It will be understood that while the stator rings 16 and 18 are illustrated in FIG. 1 as being separated from the rotor 10, these rings are actually juxtaposed with the rotor as shown in FIGS. 2 and 3 with an axial clearance of about 0.02 inch being provided between the rotor and stator blades while a tip clearance for the rotor blades of about 0.015 inch is also provided.

Located between the stator blades 20 and 22 in the ring 16 are openings 28 and 30 positioned at the exit of the second and fourth stages respectively. The opening 30 is considerably larger than the opening 28 to accommodate expansion of the fluid propellant. Similar openings 32 and 34 in the ring 18 are located between the stator blades 24 and 26 at the exits of the first and third stages respectively, and the opening 34 is likewise large than the opening 32.

An annular front casing 36 is mounted in contact with the stator ring 16 while an annular rear casing 38 is mounted in contact with the stator ring 18. The casings 36 and 38 engage each other and enclose the rings 16 and 18 as shown in FIG. 3. Referring to FIGS. 1 and 2, passages are formed in the front casing 36 for conveying fluid propellant to and from the stator blades and openings in the stator ring 16 while similar passages are likewise formed in the rear casing 38. The front casing 36 has a passage 40 in communication with the stator blades 20 at the first stage entry. Second and third passages 42 and 44 in the casing 36 are separated by a partition 46 and are in communication with the opening 28 and stator blades 22 respectively. A fourth passage 48 in the front casing 36 communicates with the opening 30 at the exit of the fourth stage.

Passages 50 and 52 in the rear casing 38 communicate with the opening 32 and stator blades 24 respectively, and these passages are separated by a partition 54. Likewise, passages 56 and 58, which communicate with the opening 34 and stator blades 26 respectively, are separated by a partition 60 in the rear casing 46.

An important feature of the invention is that a radially inward forwardly directed surface 62 on the front casing 36 in the passage 40 remote from the turbine blades 14 is rounded while a mating radially outward forwardly directed surface 64 in the same passage is similarly rounded as shown in FIG. 3. Likewise, the corresponding surfaces of passages 42, 44 and 48 are rounded in the same manner as the surfaces of the passage 40 shown in FIG. 1. A radially inward rearwardly directed surface 66 on the rear casing 38 in the passage 50 remote from the turbine blades 14 is also rounded while a mating radially outward rearwardly directed surface 68 is similarly rounded.

Here again, the corresponding surfaces of passages 52, 56 and 58 are similarly rounded. These rounded surfaces on the front casing 36 produce an increase in the velocity of the fluid flow as it passes to the stator blades 20 and 22 for turning and further acceleration at the entry of the first and third stages respectively. These surfaces further cause the fluid to diffuse and the flow velocity to decrease at the exits of the second and fourth stages. Likewise, the rounded surfaces of the rear casing 38 increase the velocity of the fluid flow before it passes through the stator blades 24 and 26 where it is turned and further accelerated at the entry of the second and fourth stages respectively, and these rounded surfaces also cause the fluid to diffuse with a decrease in flow velocity at the exits of the first and third stages.

A front housing 70 is mounted on the front casing 36 while a rear housing 72 is secured to the rear casing 38 as shown in FIG. 2. A fluid propellant inlet 74 is formed in the front housing 70, and this inlet is connected to a suitable source of fluid propellant (not shown). A chamber 76 which is likewise formed in the front housing 70 connects the passages 42 and 44 in the front casing 36 while a fluid exhaust 78 communicates with the passage 48 in the front casing 36. Likewise, a chamber 80 formed by a protuberance 82 on the rear housing 72 connects the openings 50 and 52 in the rear casing 46 while another chamber 84 formed by a larger protuberance 86 connects the openings 56 and 58 as shown in FIG. 2.

In operation, fluid propellant passes from a source (not shown) to the first turbine stage through the inlet 74 as shown by the arrows A in FIGS. 1 and 2. Then the fluid passes through the opening 40 where it is partially accelerated by the rounded surfaces 62 and 64 to the stator blades 20 where it is turned and further accelerated as indicated by the arrows B. Upon expanding through the rotor blades 14 and leaving the first stage at the exit thereof, the fluid propellant is diffused and its velocity decreased as it passes through the passage 50 having the rounded edges 66 and 68 as indicated by the arrows C. The fluid, which is at a low velocity, is turned in the chamber 80 as indicated by the arrows D, and after the low velocity fluid is turned it enters the passage 52 as indicated by the arrows E where it is partially accelerated by the rounded surfaces previously described. As the fluid leaves the passage 52, it is further accelerated and turned by the stator blades 24. The passage 50, chamber 80 and passage 52 constitute a first reentry duct for guiding the fluid propellant from the exit of the first stage to the entry of the second sage.

Upon expanding through and leaving the rotor blades 14 at the exit of the second stage, the fluid propellant passes through the opening 28 and passage 42 as indicated by the arrows F. The velocity of the flow is decreased in the passage 42 having the rounded edges, and as the diffused fluid moves through the chamber 76, it is turned as indicated by the arrows G. The fluid is then conveyed through the passage 44 where it is partially accelerated and then directed into the stator vanes 22 where its flow velocity is increased and its direction is altered as indicated by the arrows H. The passage 42, chamber 76 and passage 44 constitute a reentry duct for conveying the fluid from the second stage exit to the third stage entry.

At the exit of the third stage, the fluid passes through the opening 34 into the passage 56 where its velocity is decreased, and the fluid then flows to the chamber 84 as indicated by the arrows J. Upon entering the chamber 84, the relatively slowly moving fluid is turned as indicated by the arrows K and directed toward the passage 58 where it is again partially accelerated. The fluid moves to the stator blades 26 where it is turned and further accelerated as indicated by the arrows L. The passage 56, chamber 84 and passage 58 constitute a reentry duct for conveying the fluid from the third stage exit to the fourth stage entry.

After expanding through the fourth stage the fluid propellant leaves the rotor blades 14 and moves through the opening 30 and the passage 48 as indicated by the arrows M. The fluid is then discharged through the exhaust 78 as shown by the arrows N.

Referring to now FIG. 4, there is shown an alternate of embodiment of the invention wherein the fluid propellant flows through an inlet 74' in a housing 70' to a passage 40' in a front casing 36' as indicated by the arrow P. The fluid propellant then flows through stator blades 20' where it is accelerated and turned at the entry of the first turbine stage, and the fluid then expands through rotor blades 14' on a rotor 10'.

Upon leaving the rotor blades 14' at the exit of the first stage, the fluid flows in a substantially straight path as indicated by the arrow Q as it moves into a duct 90 formed in a rear casing 38'. The direction of the flow altered and the velocity is reaccelerated by plurality of stator blades 92 which effect an aerodynamic reentry of the fluid into the second turbine stage as indicated by the arrow R with a minimum loss of available energy of the fluid.

After expanding through the rotor blades 14' at the second stage of the turbine, the fluid flows in a generally straight path into a duct 94 as indicated by the arrow S. This straight line flow is again altered and reaccelerated by stator blades 96 in the chamber 94 to effect an aerodynamic reentry into the third turbine stage as indicated by the arrow T.

Upon discharge from the exit of the third stage, the fluid moves in a generally straight path into a duct 98 as indicated by the arrow U. Again the fluid flow is altered in direction and reaccelerated by stator blades 100 in the duct 98 which effect aerodynamic reentry of the fluid into the fourth stage as indicated by the arrows V and W. Upon leaving the rotor blades 14' at the exit of the fourth stage the fluid passes through a passage 48' as shown by the arrow X into an exhaust 78' as indicated by the arrow Y.

While several embodiments of the invention have been shown and described, it will be apparent that various structural modifications may be made to the turbine without departing from the spirit of the invention or from the scope from the subjoined claims.

What is claimed is:

1. A multistage multiple reentry reaction turbine with a fluid entry at the upstream side and a fluid exit at the downstream side of each stage, said turbine comprising, a single rotor having a plurality of rotor blades thereon and being mounted for rotation about the normal axis thereof, a pair of stator rings,
  each of said rings being in substantial juxtaposition with said rotor on opposed sides thereof, a plurality of first stator blades having converging passages therebetween mounted in one of the said stator rings adjacent said rotor blades at the upstream side of the first stage for accelerating fluid flow into said rotor blades, a plurality of second stator blades having converging passages therebetween mounted in the other of said stator rings adjacent said rotor blades at the upstream side of the second stage for accelerating fluid flow into said rotor blades, a plurality of third stator blades having converging passages therebetween mounted in said one of the said stator rings adjacent said rotor blades at the upstream side of the third stage for accelerating fluid flow into said rotor blades, a plurality of fourth stator blades having converging passages therebetween mounted on said other of said stator rings adjacent said rotor blades at the upstream side of the fourth stage for accelerating fluid flow into said rotor blades, a first casing in engagement with said one stator ring and having a plurality of first unobstructed passages therein for conveying fluid to the first and third stages and from the second and fourth stages, a second casing in engagement with said other stator ring and having a plurality of second unobstructed passages therein for conveying fluid to the second and fourth stages and from the first and third stages, a front housing in contact with said first casing and having an unobstructed chamber therein for placing one of said first unobstructed passages at the downstream side of the second stage in communication with another of said first unobstructed passages at the upstream side of the third stage whereby the fluid has unobstructed flow from the rotor blades at the downstream side of the second stage to said third stator blades, and a rear housing in contact with said second casing and having a pair of unobstructed chambers therein for placing one of said second unobstructed passages at the downstream side of the first stage in communication with another of said second unobstructed passages at the upstream side of the second stage whereby the fluid has unobstructed flow from the rotor blades at the downstream side of the first stage to said second stator blades and for placing still another of said second unobstructed passages at the downstream side of the third stage in communication with a remaining second unobstructed passage at the upstream side of the fourth stage whereby the fluid has unobstructed flow from the rotor blades at the downstream side of the third stage to said fourth stator blades.

2. A multistage multiple reentry reaction turbine as claimed in claim 1 wherein said front housing has an inlet formed therein for communicating with one of said first unobstructed passages at the upstream side of the first stage and an exhaust formed therein for communicating with another of said first unobstructed passages at the downstream side of the fourth stage.

3. A multistage multiple reentry reaction turbine with a fluid entry at the upstream side and a fluid exit at the downstream side of each stage, said turbine comprising, a single rotor having a plurality of rotor blades thereon and mounted for rotation about the normal axis thereof, a pair of stator rings,
  each of said rings being in substantial juxtaposition with said rotor on opposed sides thereof, a first group of stator blades having converging passages therebetween mounted in one of said stator rings adjacent said rotor blades at the upstream side of the first stage for accelerating fluid flow into said rotor blades, a second group of stator blades having converging passages therebetween mounted in the other of said stator rings adjacent said rotor blades at the upstream side of the second stage for accelerating fluid flow into said rotor blades, a third group of stator blades having converging passages therebetween mounted in said one stator ring adjacent said rotor blades at the upstream side of the third stage for accelerating fluid flow into said rotor blades,
  said one stator ring having a pair of oppositely disposed first vaneless openings extending therethrough between said first and third groups of stator blades,
  one of said first vaneless openings being positioned adjacent the downstream side of the second stage, and
  the other of said first vaneless openings being positioned adjacent the downstream side of the fourth stage, a fourth group of stator blades having converging passages therebetween mounted on said other of said stator rings adjacent said rotor blades at the upstream side of the fourth stage for accelerating fluid flow into said rotor blades,
  said other stator ring having a pair of oppositely disposed second vaneless openings extending therethrough between the said second and fourth groups of stator blades,
  one of said second vaneless openings being positioned adjacent the downstream side of the first stage, and
  the other of said second vaneless openings being positioned adjacent the downstream side of the third stage, a front casing in engagement with said one stator ring and having a plurality of unobstructed front passages therein,
  a first of said front passages communicating with said first group of stator blades,
  a second of said front passages communicating with said one of said first vaneless openings,
  a third of said front passages communicating with said third group of stator blades, and
  a fourth of said front passages communicating with said other of said first vaneless openings, a rear casing in engagement with said other stator ring and having a plurality of unobstructed rear passages therein,
  a first of said rear passages communicating with said one of said second vaneless openings,
  a second of said rear passages communicating with said second group of stator blades,
  a third of said rear openings communicating with said other of said second vaneless openings, and a fourth of said rear passages communicating with said fourth group of stator blades, a front housing in contact with said front casing, an unobstructed chamber in said front housing for placing said second front passage in communication with said third front passage whereby the fluid has unobstructed flow from the rotor blades at the downstream side of the second stage to said third group of stator blades, a rear housing in contact with said rear casing, a first unobstructed chamber in said rear housing for placing said first rear passage in communication with said second rear passage whereby the fluid has unobstructed flow from the rotor blades at the downstream side of the first stage to said second group of stator blades, and a second unobstructed chamber in said rear housing for placing said third rear passage in communication with said fourth rear passage whereby the fluid has unobstructed flow from the rotor blades at the downstream side of the third stage to said fourth group of stator blades.

4. A multistage multiple reentry reaction turbine as claimed in claim 3, wherein said front housing has an inlet formed therein for communicating with said first front passage and an exhaust formed therein for communicating with said fourth front passage.

References Cited by the Examiner

UNITED STATES PATENTS

| | | | |
|---|---|---|---|
| 788,097 | 4/05 | Ehrhart | 253—66 |
| 876,530 | 1/08 | Douse | 253—66 |
| 898,127 | 9/08 | Moore | 253—66 |

FOREIGN PATENTS

| | | |
|---|---|---|
| 27,668 | 1908 | Great Britain. |
| 3,185 | 11/91 | Sweden. |
| 294,828 | 2/54 | Switzerland. |

JOSEPH H. BRANSON, Jr., *Primary Examiner.*